(12) United States Patent
Sandberg et al.

(10) Patent No.: US 10,568,106 B2
(45) Date of Patent: Feb. 18, 2020

(54) ESTIMATION OF PARAMETERS USED FOR DETERMINING A SIGNAL-TO-INTERFERENCE MEASURE AT A WIRELESS COMMUNICATION DEVICE

(71) Applicant: Telefonaktiebolaget LM Ericsson (publ), Stockholm (SE)

(72) Inventors: David Sandberg, Solna (SE); Anders Christensson, Ängelholm (SE); Björn Nordström, Hässelby (SE); Magnus Persson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/093,969

(22) PCT Filed: May 4, 2016

(86) PCT No.: PCT/SE2016/050406
§ 371 (c)(1),
(2) Date: Oct. 15, 2018

(87) PCT Pub. No.: WO2017/192078
PCT Pub. Date: Nov. 9, 2017

(65) Prior Publication Data
US 2019/0141716 A1 May 9, 2019

(51) Int. Cl.
*H04W 72/08* (2009.01)
*H04L 1/00* (2006.01)
(Continued)

(52) U.S. Cl.
CPC ........ *H04W 72/082* (2013.01); *H04B 17/336* (2015.01); *H04L 1/0015* (2013.01);
(Continued)

(58) Field of Classification Search
None
See application file for complete search history.

(56) References Cited

U.S. PATENT DOCUMENTS

| | | | |
|---|---|---|---|
| 2011/0065446 A1* | 3/2011 | Mueck | H04W 72/082 455/452.2 |
| 2011/0110251 A1* | 5/2011 | Krishnamurthy | H04W 72/082 370/252 |

(Continued)

FOREIGN PATENT DOCUMENTS

CN 103051430 A 4/2013

OTHER PUBLICATIONS

International Search Report and Written Opinion for Application No. PCT/SE2016/050406, dated Dec. 1, 2016, 16 pages.
(Continued)

*Primary Examiner* — Brian S Roberts
(74) *Attorney, Agent, or Firm* — NDWE LLP

(57) ABSTRACT

A method performed by a node in a wireless communication network of estimating parameters used for determining a signal-to-interference measure at a communication device served by a base station, and a node performing the method. The method comprises acquiring an estimate of channel condition between the communication device and the serving base station, and between the communication device and at least one base station of a neighbouring cell, estimating the signal-to-interference measure using the estimate of the respective channel condition, and acquired output power and Physical Resource Block (PRB) utilization of each of the base stations, and receiving an indication of quality of a channel via which the communication device is served by the base station. The method further comprises determining whether a change in the estimate of the signal-to-interfer- (Continued)

ence measure is required based on the indication of channel quality, and updating the estimate of the channel condition.

18 Claims, 7 Drawing Sheets

(51) Int. Cl.
| | |
|---|---|
| *H04B 17/336* | (2015.01) |
| *H04L 1/20* | (2006.01) |
| *H04L 1/16* | (2006.01) |
| *H04L 5/00* | (2006.01) |
| *H04W 4/70* | (2018.01) |
| *H04L 1/18* | (2006.01) |
| *H04B 17/345* | (2015.01) |
| *H04B 17/29* | (2015.01) |
| *H04W 52/24* | (2009.01) |
| *H04L 25/02* | (2006.01) |
| *H04W 72/12* | (2009.01) |

(52) U.S. Cl.
CPC .......... *H04L 1/0023* (2013.01); *H04L 1/0026* (2013.01); *H04L 1/1671* (2013.01); *H04L 1/20* (2013.01); *H04L 5/0032* (2013.01); *H04L 5/0057* (2013.01); *H04L 5/0073* (2013.01); *H04B 17/29* (2015.01); *H04B 17/345* (2015.01); *H04L 1/002* (2013.01); *H04L 1/0003* (2013.01); *H04L 1/1812* (2013.01); *H04L 25/0204* (2013.01); *H04W 4/70* (2018.02); *H04W 52/241* (2013.01); *H04W 72/1215* (2013.01)

(56) References Cited

U.S. PATENT DOCUMENTS

| | | | |
|---|---|---|---|
| 2015/0049629 A1* | 2/2015 | Alm | H04L 1/0003 370/252 |
| 2015/0098440 A1* | 4/2015 | Yang | H04J 11/0056 370/330 |
| 2015/0110024 A1* | 4/2015 | Manssour | H04W 72/1226 370/329 |

OTHER PUBLICATIONS

Motorola, "Discussion of time domain eICIC scheme for Rel-10," 3GPP TSG RAN WG1 Meeting #62bis, Oct. 11-15, 2010, R1-105622, 6 pages.

\* cited by examiner

ESTIMATION OF PARAMETERS USED FOR DETERMINING A SIGNAL-TO-INTERFERENCE MEASURE AT A WIRELESS COMMUNICATION DEVICE

CROSS-REFERENCE TO RELATED APPLICATIONS

This application is a National stage of International Application No. PCT/SE2016/050406, filed May 4, 2016, which is hereby incorporated by reference.

TECHNICAL FIELD

The invention relates to a method performed by a node in a wireless communication network of estimating parameters used for determining a signal-to-interference measure at a wireless communication device served by a base station, and a node performing the method.

BACKGROUND

Currently solutions for Massive Machine Type Communication (M-MTC) are being standardized within 3rd Generation Partnership Project (3GPP). These solutions include NarrowBand Internet of Things (NB-IoT) and Long Term Evolution (LTE) Cat-M ("Category Machines"). They are both targeting similar use cases with extreme battery lifetime, support for large coverage and inexpensive terminal chipsets.

A typical use case is a communication device in the form of e.g. a power meter located in a basement outside normal cellular coverage. Hence, many of the devices are expected to be stationary. Also, for the majority of the devices in a network, the coverage condition is quite good and bit rates of around 100 kbps can be achieved. For exceptional cases, devices located in areas suffering from extremely limited coverage conditions, e.g. deep underground or in basements, the data rate can be scaled down to enhance the coverage.

For both NB-IoT and LTE Cat-M it can be expensive to schedule Channel Quality Indication (CQI) reports, and for extended coverage mode in Cat-M the support for CQI reports has even been removed. Since IoT devices can experience very high path loss in downlink, reception quality can be heavily impacted by interference from neighboring cells.

However, without explicit channel feedback (i.e. CQI or similar) from the device there is no way to know how much this interference affects reception quality. This means that it will be impossible for a base station serving the device to track changes in downlink interference. Ultimately, this means that link adaptation for the downlink may be too aggressive resulting in periods of time when downlink block error rate can be very high.

SUMMARY

An object of the invention is to solve, or at least mitigate, this problem in the art and thus to provide an improved method of estimating a signal-to-interference measure at a communication device.

This object is attained in a first aspect of the invention by a method at a node in a wireless communication network of estimating parameters used for determining a signal-to-interference measure at a wireless communication device served by a base station. The method comprises acquiring an estimate of channel condition between the communication device and the serving base station, and between the communication device and at least one base station of a neighbouring cell, estimating the signal-to-interference measure using the estimate of the respective channel condition and acquired output power and Physical Resource Block (PRB) utilization of each of the base stations, to be complied with when communicating with the communication device, and receiving, from the communication device, an indication of quality of a channel via which the communication device is served by the base station. The method further comprises determining whether a change in the estimate of the signal-to-interference measure is required based on said indication of channel quality, and if so updating the estimate of the channel condition between the communication device and the serving base station and/or between the communication device and the at least one base station of a neighbouring cell to attain the required change in the estimate of the signal-to-interference measure.

This object is attained in a second aspect of the invention by a network node configured to estimate parameters used for determining a signal-to-interference measure at a wireless communication device served by a base station in a wireless communication network, the network node comprising a processing unit and a memory, said memory containing instructions executable by said processing unit, whereby said network node is operative to acquire an estimate of channel condition between the communication device and the serving base station, and between the communication device and at least one base station of a neighbouring cell, estimate the signal-to-interference measure using the estimate of the respective channel condition and acquired output power and Physical Resource Block (PRB) utilization of each of the base stations, to be complied with when communicating with the communication device. The network node is further operative to receive, from the communication device, an indication of quality of a channel via which the communication device is served by the base station, determine whether a change in the estimate of the signal-to-interference measure is required based on said indication of channel quality, and if so to update the estimate of the channel condition between the communication device and the serving base station and/or between the communication device and the at least one base station of a neighbouring cell to attain the required change in the estimate of the signal-to-interference measure.

Hence, with an embodiment of the invention, a method is proposed for determining a signal-to-interference measure at a wireless communication device being subjected to interference by base station(s) of one or more neighbouring cells. The communication device may be embodied in the form of a sensor such as temperature or power sensor, or a User Equipment (UE) such as a smart phone, a tablet, a laptop, a gaming console, etc.

This signal-to-interference measure may be embodied in the form of a Signal-to-Interference Ratio (SIR) calculated for submissions undertaken by a base station serving the communication device such that downlink signals submitted by the serving base station is received by the communication device with an adequate quality; if the interference of one or more neighbouring base stations are too strong with respect to a "useful" signal submitted by the serving base station, the communication device will not be able to demodulate the useful signal submitted by the serving base station.

In the following, an embodiment using SIR as signal-to-interference measure will be discussed, followed by an embodiment further taking into account thermal noise at the communication device, in which case Signal-to-Interference-plus-Noise Ratio (SINR) will be used as signal-to-interference measure.

To this end, parameters of the communication system stipulating the signal-to-interference measure must be estimated in order to perform a correct link adaption of the downlink. Generally, link adaption in the downlink is performed for calculating a Modulation and Coding Scheme (MCS) that achieves a good throughput. In its simplest form, this calculation is a look-up in a pre-calculated table that maps a particular estimated SIR/SINR to a corresponding MCS. More advanced methods for downlink link adaptation may take into account overhead contribution due to transmission of common control channels, like for example Physical Downlink Control Channel (PDCCH).

One parameter used for determining the signal-to-interference measure, being dependent of interference caused by a neighbouring base station, is channel condition between the communication device and the serving base station and between the communication device and the neighbouring base station. Hence, a channel condition in the form of a transfer function or gain g between the communication device and (a) the serving base station and (b) the neighbouring base station is required.

Now, power r received at the communication device from a base station is calculated as:

$$r = p \cdot u \cdot g \quad (1)$$

where p denotes transmitted power of the base station, g denotes the gain, and u denotes frequency domain utilization, commonly referred to as Physical Resource Block (PRB) utilization. For simplicity, in the following discussion it is assumed that u denotes the fraction of utilized PRBs (i.e. amounting to 1 if all PRBs are utilized for a cell), but it should be noted that u can also denote the relative overlap between the serving cell and the neighbouring cell.

For instance, in case u denotes the relative PRB overlap between a transmission in the serving cell and a transmission in a neighbouring cell, e.g., if the serving cell transmits on PRBs 0 to 5 and the neighbour transmits on PRBs 4 to 7, two PRBs out of six would be interfered with and u for the neighbouring cell would amount to 2/6.

If an index of 0 denotes the serving base station while an index of 1 denotes a single neighbouring base station, SIR is calculated as:

$$SIR = \frac{p_0 \cdot u_0 \cdot g_0}{p_1 \cdot u_1 \cdot g_1} \quad (2a)$$

Now, of these parameters, the serving base station is already aware of its transmission power $p_0$ and its PRB utilization $u_0$. Further, the serving base station could rather straightforwardly be made aware of the corresponding parameters $p_1$, $u_1$ of the neighbouring base station, for instance by having the neighbouring base station parameter report the parameters over a so called X2 interface between the two base stations and/or using historical PRB utilization of the interfering cell(s).

Thus, channel condition towards the communication device in the form of gain g for the serving base station and the neighbouring base station must be estimated in order to ultimately estimate a correct SIR. Initially, an estimate of the respective channel condition $\hat{g}_0$, $\hat{g}_1$ is acquired, for instance from historical data. These are used as starting values for an iterative process of determining "true" channel conditions resulting in an adequately estimated SIR. In a practical case, hundreds of iterations may be required for having the respective estimated channel condition $\hat{g}_0$, $\hat{g}_1$ converge to its true value reflecting actual channel conditions.

Using these initial gain estimates, the signal-to-interference measure at the communication device is estimated by calculating SIR in accordance with equation (2a).

Thereafter, the serving base station receives, from the communication device, data indicating quality of a channel via which the communication device is served by the network node. In an example, a Hybrid Automatic Repeat Request (HARQ) approach may be utilized, where an ACK is sent if data is correctly received at the device, while a NACK is sent if it is not.

In an exemplifying embodiment, assuming that the serving base station receives a NACK; this would indicate that the estimated SIR based on the initially set gain parameters is too high. That is, it has been assumed that quality of the channel established with the serving base station is higher than it in practice is and/or that the interference caused by the neighbouring base station is lower than it in practice is.

Hence, based on the channel quality indication received from the communication device as a feedback to the currently estimated SIR, the serving base station determines whether a change of the currently estimated SIR is required. The receiving of the channel quality indication is particularly advantageous in a scenario where CQI reports cannot be sent, or for any reason are not sent, as previously discussed.

With the received NACK, a change of the currently estimated SIR is required, i.e. the estimated SIR should be lowered, meaning that either the gain $\hat{g}_0$ of the serving channel is too high and/or the gain $\hat{g}_1$ of the interfering channel is too low.

As a result, either one or both of the gain estimates are updated—i.e. $\hat{g}_0$ is decreased and/or $\hat{g}_1$ is increased—thereby creating an updated estimate of the channel condition between the communication device and the serving base station and/or between the communication device and the neighbouring base station resulting in the required change in the form of a decreased estimated SIR.

In another exemplifying embodiment, assuming that the serving base station receives an ACK; this would indicate that the estimated SIR based on the initially set gain parameters is too low. That is, it has been assumed that quality of the channel established with the serving base station is lower than it in practice is and/or that the interference caused by the neighbouring base station is higher than it in practice is.

Again, based on the channel quality indication received from the communication device as a feedback to the currently estimated SIR, the serving base station determines whether a change of the currently estimated SIR is required.

With the received ACK, a change of the currently estimated SIR is required, i.e. the SIR should be raised, meaning that either the gain $\hat{g}_0$ of the serving channel is too low and/or the gain $\hat{g}_1$ of the interfering channel is too high.

As in the previously described embodiment, either one or both of the gain estimates are updated—i.e. $\hat{g}_0$ is increased and/or $\hat{g}_1$ is decreased—thereby creating an updated estimate of the channel condition between the communication device and the serving base station and/or between the communication device and the neighbouring base station resulting in the required change in the form of an increased estimated SIR.

As previously discussed, this process is repeated, thereby continuously updating the respective gain until an estimated SIR reflecting the true downlink conditions advantageously is obtained for the channel set up between the communication device and the serving base station. The respective channel condition has thus been correctly estimated and can subsequently be used for calculating a correct SIR, and adaption of the downlink may thus be performed to adapt to the correctly calculated SIR.

Advantageously, by attaining a SIR reflecting true channel conditions, improved robustness to interference peaks is accomplished, since the serving base station can adapt to interference also when only coarse feedback (such as HARQ) is available.

Further advantageous is that with an adequately determined SIR, improved downlink resource efficiency is accomplished since the serving base station need not apply an overly large interference margin at low-load scenarios.

In yet another embodiment, not only is interference of any neighbouring base station(s) taken into account, but so is thermal noise n experienced by the communication device. The signal-to-interference measure to be determined may thus be extended from SIR to SINR. Hence, expansion of equation (2a) results in:

$$SINR = \frac{p_0 \cdot u_0 \cdot g_0}{n + p_1 \cdot u_1 \cdot g_1} \qquad (2b)$$

In this embodiment, not only channel condition towards the communication device in the form of gain g for the serving base station and the neighbouring base station must be estimated, but further the thermal noise n experienced by the communication device, in order to ultimately estimate a correct SINR.

Initially, an estimate of the thermal noise n̂, is acquired, in addition to the respective estimated channel condition $\hat{g}_0$, $\hat{g}_1$, for use as starting values for an iterative process of determining "true" noise and channel conditions resulting in an adequately estimated SINR. Again, hundreds of iterations may be required in practice for having the respective channel condition $g_0$, $g_1$, and the thermal noise n converge to its true values reflecting actual noise and channel conditions.

Using these initial noise and gain estimates, the SINR is calculated in accordance with equation (2b).

Thereafter, as previously has been described, the serving base station receives, from the communication device, data indicating quality of a channel as previously described, using for instance a HARQ approach with ACK/NACK signalling.

Hence, based on the channel quality indication received from the communication device as a feedback to the currently estimated SINR, the serving base station determines whether a change of the currently estimated SINR is required. In analogy with the above, the estimate of the thermal noise is updated to attain the required change in the form of a decreased/increased estimated SINR.

Further provided is a computer program comprising computer-executable instructions for causing the node to perform steps according to an embodiment of the first aspect of the invention, when the computer-executable instructions are executed on a processing unit included in the node.

Yet further provided is a computer program product comprising a computer readable medium, the computer readable medium having the computer program of the node embodied thereon.

Further embodiments will be described in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description. Throughout the application, linear representations of the equations are set forth. However, the equations could equally well be implemented by means of logarithmic representations.

Figure 1:
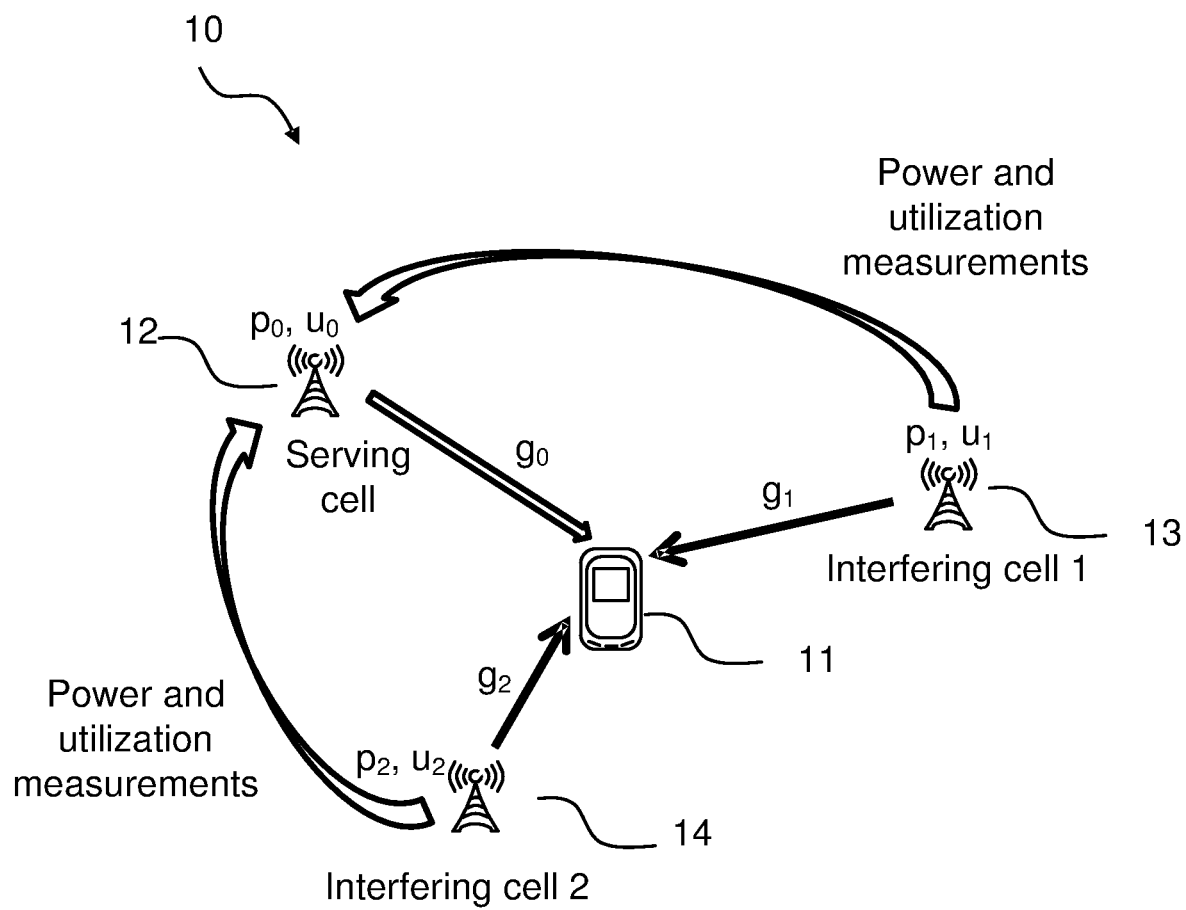
FIG. 1 schematically illustrates a communication network where embodiments advantageously may be implemented, in which a communication device is served by a serving base station and two neighbouring and potentially interfering base stations are present.

FIG. 1 schematically illustrates a communication network 10 where embodiments advantageously may be implemented, in which a communication device 11 is served by a serving base station 12. FIG. 1 further shows two neighbouring—potentially interfering—base stations 13 and 14. As previously discussed, the gain of the base stations is denoted g, the PRB utilization is denoted u and the transmit power is denoted p.

In previously described exemplifying embodiments, it has been assumed that the communication device 11 is subjected to interference from a single neighbouring base station. This may be extended to any number of interfering base stations, calculating SIR as:

$$SIR = \frac{p_0 \cdot u_0 \cdot g_0}{\sum_{i \neq 0} p_i \cdot u_i \cdot g_i} \quad (2c)$$

and SINR as:

$$SINR = \frac{p_0 \cdot u_0 \cdot g_0}{n + \sum_{i \neq 0} p_i \cdot u_i \cdot g_i} \quad (2d)$$

Figure 2:
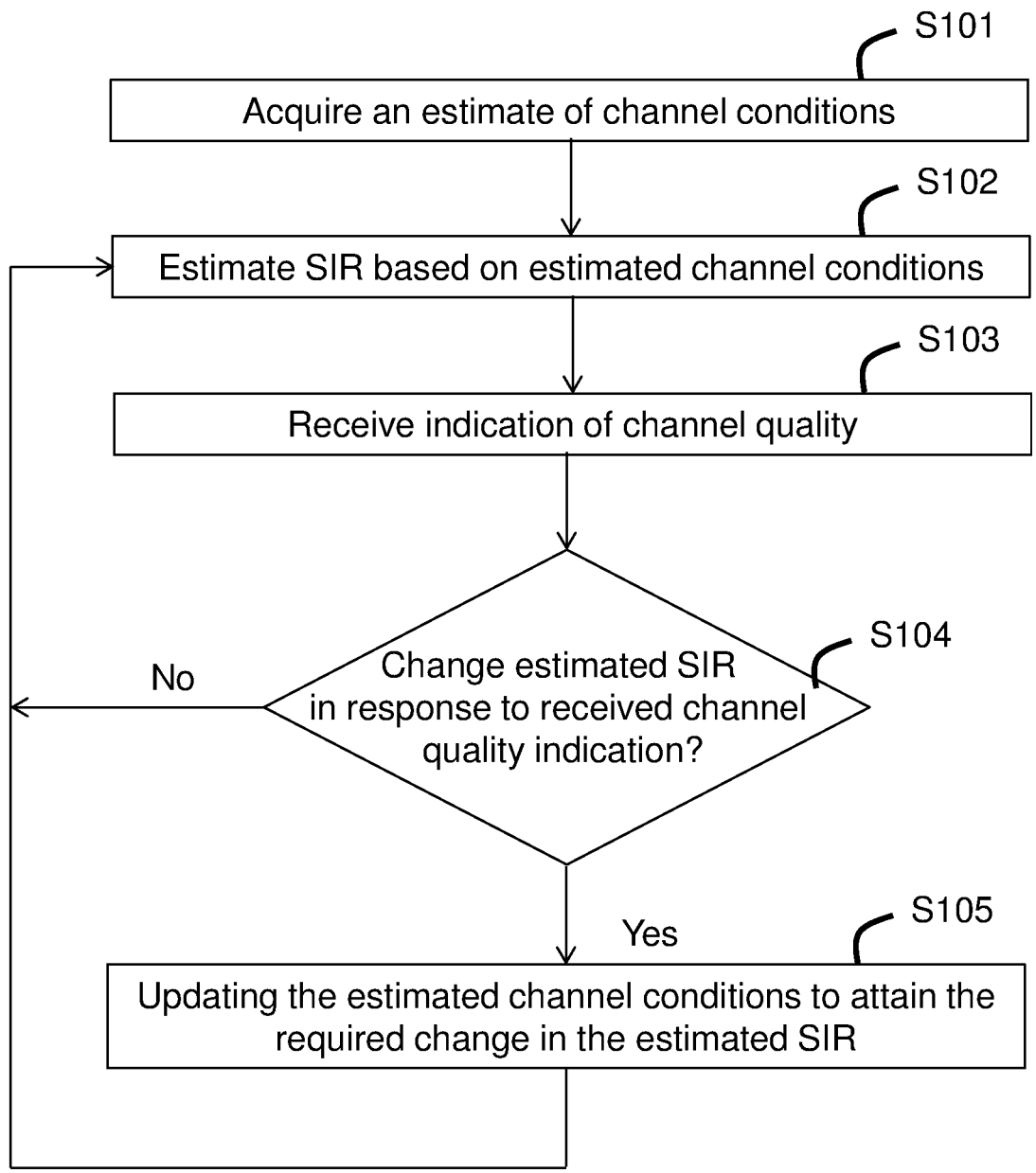
FIG. 2 shows a flowchart of a method of estimating parameters used for determining a SIR at a wireless communication device served by a base station in an embodiment.

FIG. 2 shows a flowchart of a method performed by a base station 12 in a wireless communication network 10 of estimating parameters used for determining a signal-to-interference measure at a wireless communication device 11 served by the base station 12.

In the following, it is assumed that the serving base station 12 performs the estimation of SIR/SINR and associated parameters. However, it is envisaged that this may be performed at other physical or functional network nodes, other than a Radio Access Network (RAN) node such as a base station, for instance by core network nodes such as a Mobility Management Entity (MME), a Serving Gateway (SGW), a Packet Data Network Gateway (PGW), etc, or even an application server connected to the RAN via a Packet Data Network (PDN). Further, the steps of estimating SIR/SINR and associated parameters may be distributed over a number of nodes.

Now, in case of estimating SIR, the serving base station 12 initially acquires, in step S101, an estimate of channel conditions $\hat{g}_0$, $\hat{g}_1$, $\hat{g}_2$ for each base station 12, 13, 14, respectively.

The serving base station 12 is aware of its transmission power $p_0$ and its PRB utilization $u_0$, and may further already be aware of the corresponding parameters $p_1$, $u_1$ and $p_2$, $u_2$ of each neighbouring base station 13 and 14. If not, the serving base station 12 could request these over the X2 interface (or possibly use historical PRB utilization of the interfering cells).

Thereafter, in step S102, the serving base station estimates SIR using equation (2c), and communication between the serving base station 12 and the communication device will be performed using the estimated SIR as a target level to comply with. Hence, downlink communication is performed taking into account the estimated SIR.

For instance, a Modulation and Coding Scheme (MCS) of the serving base station 12 is adapted to obtain a given block error based on the SIR experienced at the communication device 11. More or less advanced known methods can be envisaged to adapt the downlink. A basic approach of downlink adaption is to store a look-up table mapping a particular SIR to a particular MCS. Hence, for an estimated SIR, a corresponding pre-stored MCS is selected from the look-up table. More advanced methods for link adaptation in downlink also takes into account overhead contribution due to transmission of common control channels, for example a Physical Downlink Control Channel (PDCCH).

In response thereto, the serving base station 12 receives from the communication device 11 in step S103 an indication of quality of the channel via which the communication device 11 is served by the base station 12.

In step S104, the serving base station 12 determines whether a change in the estimated SIR is required based on the indication of channel quality received from the communication device 11.

If so, the serving base station 12 updates the estimated channel conditions $\hat{g}_0$, $\hat{g}_1$, $\hat{g}_2$ for each base station 12, 13, 14, respectively, in order to attain the required change in the estimated SIR.

Thereafter, the serving base station 12 returns to step S102 where a new iteration is undertaken by using the changed estimated SIR.

It is noted that even if the serving base station 12 would come to the conclusion in step S104 that the estimated SIR indeed appears to comply with true the conditions experienced by the communication device 11, and that the estimated channel conditions $\hat{g}_0$, $\hat{g}_1$, $\hat{g}_2$ need not be updated, the true SIR experienced at the communication device 11 may change rapidly and continuously, thereby constantly requiring new iterations to be performed.

Figure 3:
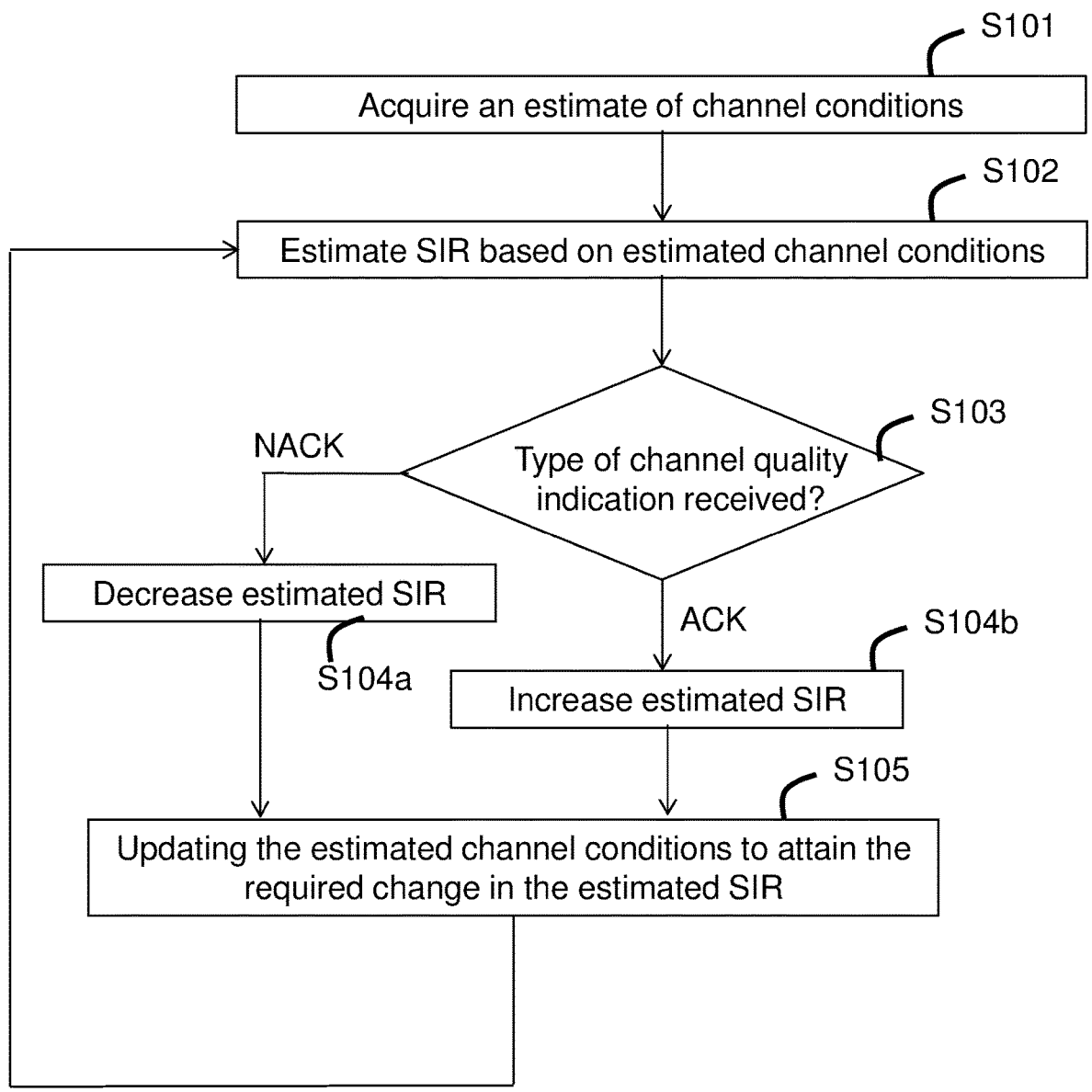
FIG. 3 shows a flowchart of a method of estimating parameters used for determining a SIR at a wireless communication device served by a base station by means of HARQ signalling in another embodiment.

FIG. 3 illustrates a further exemplifying embodiment where a HARQ approach is utilized to indicate channel quality to the serving base station 12. In such a scenario, an ACK is sent if data is correctly received at the device 11, while a NACK is sent if it is not.

Thus, assuming that the serving base station 12 receives a NACK in step S103, which would indicate that the estimated SIR based on the initially estimated gain parameters is too high. That is, it has been assumed that quality of the channel established with the serving base station 12 is higher than it in practice is and/or that the interference caused by the neighbouring base stations 13, 14 is lower than it in practice is.

Again, based on the channel quality indication (ACK/NACK) received from the communication device 11 as a feedback to the currently estimated SIR, the serving base station 12 determines whether a change of the currently estimated SIR is required.

With the received NACK, it is determined in step 104a that a decrease of the currently estimated SIR is required, meaning that either the gain $\hat{g}_0$ of the serving channel is too high and/or the gain $\hat{g}_1$, $\hat{g}_2$ of the interfering channels is too low.

As a result, in step S105, either one, two or all of the gain estimates are updated—i.e. $\hat{g}_0$ is decreased and/or $\hat{g}_1$, $\hat{g}_2$ is increased—thereby creating an updated estimate of the channel condition between the communication device 11 and the serving base station 12 and/or between the communication device 11 and the neighbouring base stations 13, 14 in order to attain the required decrease of the estimated SIR.

Thereafter, the serving base station 12 returns to step S102 where a new iteration is undertaken by using the changed (decreased) estimated SIR.

In another scenario, assuming that the serving base station 12 receives an ACK in step S103, which would indicate that the estimated SIR based on the initially set gain parameters is too low. That is, it has been assumed that quality of the channel established with the serving base station 12 is lower than it in practice is and/or that the interference caused by the neighbouring base stations 13, 14 is higher than it in practice is.

With the received ACK, a change of the currently estimated SIR is required, i.e. the SIR should be increased, meaning that either the gain $\hat{g}_0$ of the serving channel is too low and/or the gain $\hat{g}_1$, $\hat{g}_2$ of the interfering channels is too high.

As a result, in step S105, either one, two or both of the gain estimates are updated—i.e. $\hat{g}_0$ is increased and/or $\hat{g}_1$, $\hat{g}_2$ is decreased—thereby creating an updated estimate of the channel condition between the communication device 11 and the serving base station 12 and/or between the communication device 11 and the neighbouring base stations 13, 14 in order to attain the required increase of the estimated SIR.

Thereafter, the serving base station 12 returns to step S102 where a new iteration is undertaken by using the changed (increased) estimated SIR.

Figure 4:
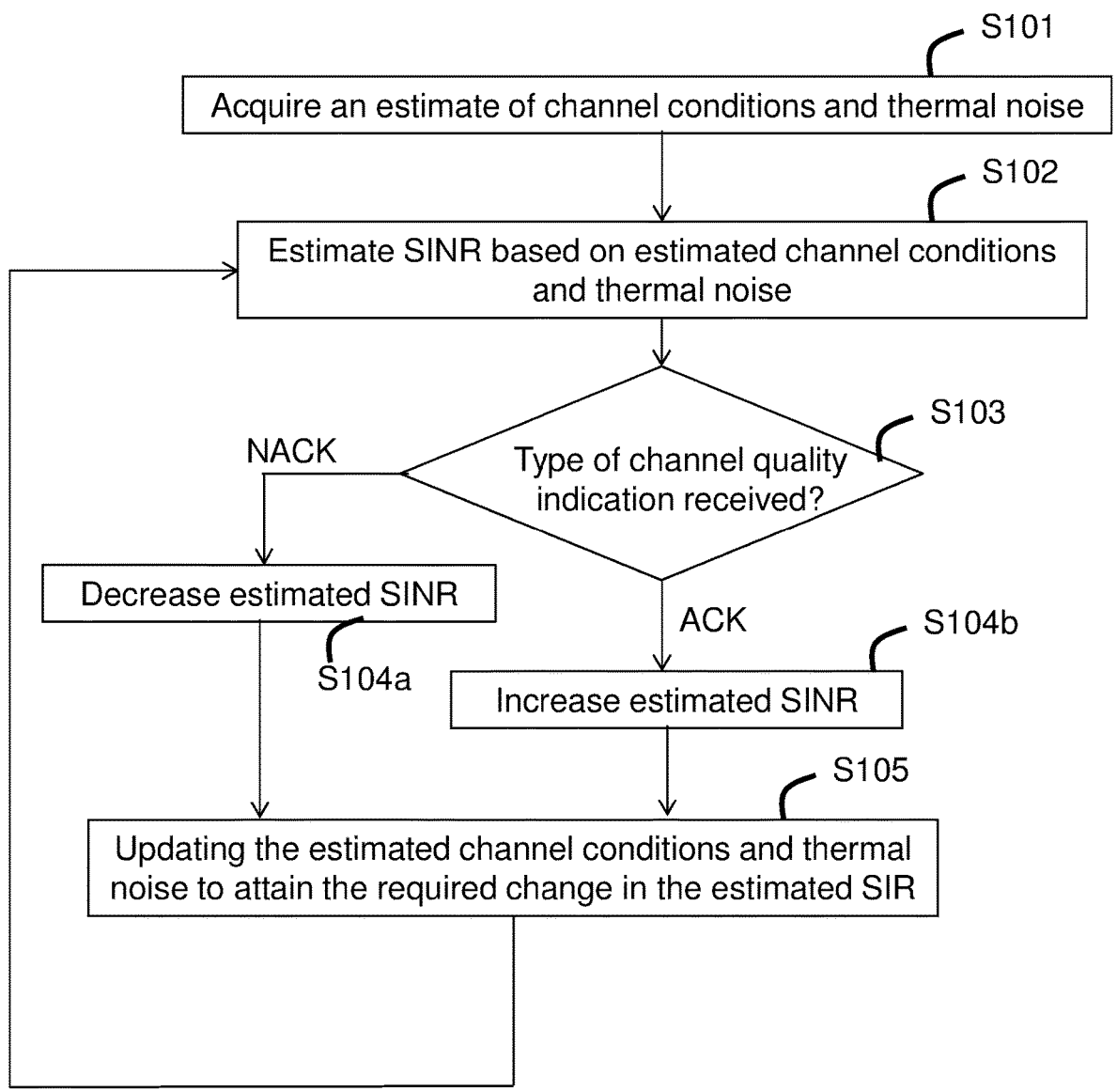
FIG. 4 shows a flowchart of a method of estimating parameters used for determining a SINR at a wireless communication device served by a base station in a further embodiment.

FIG. 4 shows yet an embodiment similar to that shown in FIG. 2, the difference being that the thermal noise n at the communication device is taken into account for estimating SINR using equation (2d). In such an embodiment, not only the gain g must be estimated, but further the noise n.

In previous exemplifying embodiments, both SIR and SINR estimations has been calculated as a signal-to-interference measure. In the following, SINR will be used, being a more thorough measure taking into account thermal noise at the communication device 11.

The communication device 11 will continuously send feedback, previously exemplified with ACK/NACK signaling, which is used by the serving base station 12 to iteratively update and improve the estimates of the system model parameters in order to ultimately calculate a SINR reflecting true conditions, which true SINR will be complied with by the serving base station 12 when communication with the device 11.

The parameters to be continuously updated are thus the thermal noise n at the communication device and the respective gain $g_i$. An update rule can in an embodiment be derived by taking the partial derivative of the SINR with respect to the parameter that is to be updated.

Hence, this partial derivative will represent the required change in estimated SINR in response to receiving the channel quality indication from the communication device.

In the following, the PRB utilization $u_o$ of the serving base station 12 is for simplicity assumed to be 1.0.

For the thermal noise, the partial derivative is calculated as:

$$\frac{\partial SINR}{\partial n} = \frac{-p_0 \cdot g_0}{\left(n + \sum_{i \neq 0} p_i \cdot u_i \cdot g_i\right)^2} \quad (3)$$

Similarly, for the gain g of the respective base station, the partial derivative is calculated as:

$$\frac{\partial SINR}{\partial g_i} = \frac{-p_0 \cdot g_0 \cdot p_i \cdot u_i \cdot g_i}{\left(n + \sum_{i \neq 0} p_i \cdot u_i \cdot g_i\right)^2} \quad (4)$$

Using HARQ for providing feedback in the form of ACK/NACK signaling from the communication device, the estimated parameters used for estimating SINR may in an embodiment be updated as:

$$\Delta \hat{n} = \left(1 + \hat{n} \cdot \frac{\partial SINR}{\partial \hat{n}}\right)^{step} \quad (5)$$

and $$\Delta \hat{g}_i = \left(1 + \hat{g}_i \cdot \frac{\partial SINR}{\partial \hat{g}_i}\right)^{step} \quad (6)$$

where $\Delta \hat{n}$ and $\Delta \hat{g}_i$ are the updates for the noise and gains respectively and step in an embodiment is set as:

$$step = \begin{cases} ACK: & \lambda \\ NACK: & -\lambda \end{cases} \quad (7)$$

where step is a parameter reflecting the indicated channel quality feedback. In equation (7), step is set to a numerical value $\lambda$ in case of ACK and to the negative $-\lambda$ of that numerical value in case of NACK, where $\lambda$ is a parameter controlling the convergence rate of the algorithm.

Here, a higher $\lambda$ typically gives a faster convergence but a too high $\lambda$ can cause the algorithm to become unstable. As previously described, when a NACK is received it means that the SINR used for link adaptation was too high, while if an ACK is received the SINR used for link adaptation was too low.

The partial derivatives $$\frac{\partial SINR}{\partial n} \text{ and } \frac{\partial SINR}{\partial g_i}$$

indicate how to change the system model parameters in order to increase or decrease the SINR.

Hence, in this embodiment, an update factor $\Delta \hat{n}$ and $\Delta \hat{g}_i$ is calculated for the noise and gain, respectively, which is used to update the current noise and gain estimate.

In an embodiment, the updates are performed as:

$$\hat{n}_{t+1} = \Delta \hat{n} * \hat{n}_t \quad (8)$$

$$\hat{g}_{i(t+1)} = \Delta \hat{g}_i * \hat{g}_{i(t)} \quad (9)$$

Hence, a current estimate $\hat{n}_t$ and $\hat{g}_{i(t)}$ is updated with the respective update factor $\Delta \hat{n}$ and $\Delta \hat{g}_i$ to create an updated estimate $\hat{n}_{t+1}$ and $\hat{g}_{i(t+1)}$ subsequently used for calculating an adjusted SINR to be complied with by the serving base station 12, by means of performing link adaption of the downlink, when communication with the communication device 11.

In practice, it is oftentimes desirable to maintain a predetermined Block Error Rate (BLER) target value, i.e. a target for the ratio of received ACKs and NACKs.

In an embodiment, this is accomplished by modifying equation (7). Instead of applying symmetric adjustments for both ACK and NACK, the relation between the adjustments causing increase or decrease in SINR is set by taking into account the target block error rate:

$$step = \begin{cases} ACK: & \frac{BLER_{target}}{1 - BLER_{target}} \cdot \lambda \\ NACK: & -\lambda \end{cases} \quad (10)$$

As previously described, the parameter $\lambda$ controls the convergence rate of the algorithm, but the adjustment in case of ACK has been changed to account for the $BLER_{target}$, which for example could be set to 0.1.

Additionally, in the description above it is assumed that channel quality indication only in the form of HARQ feedback is received at the serving base station 12 from the communication device 11, and that the updates are based on that. However, the same method is applicable also for CQI reports with a slight modification. Hence, in an embodiment, the parameter step reflecting the indicated channel quality is instead calculated based on the received CQI report and the current estimated SINR as:

$$step = (SINR_{cqi,dB} - SINR_{est,dB}) \quad (11)$$

Here, $SINR_{cqi,dB}$ is the SINR [in dB] indicated by a CQI report, while $SINR_{est,dB}$ is the currently estimated SINR calculated based on equation (2d) and the currently estimated parameter values $\hat{n}$ and $\hat{g}_i$.

As has been discussed, to apply the estimation of parameters $\hat{n}$ and $\hat{g}_i$ for determining a signal-to-noise measure at the communication device 11 in a network 10 as that illustrated with reference to FIG. 1, the PRB utilization for interfering cells 13, 14 need to be known by the serving base station 12. To this end, a centralized or a distributed solution could be envisaged. In a centralized solution, acquiring and storing of the respective PRB utilization could be performed by a node located in the "cloud". For a distributed solution, PRB utilization measurements could be signalled between base station over X2 interfaces, for instance by using the known High Interference Indicator (HII) mechanism.

Figure 5:
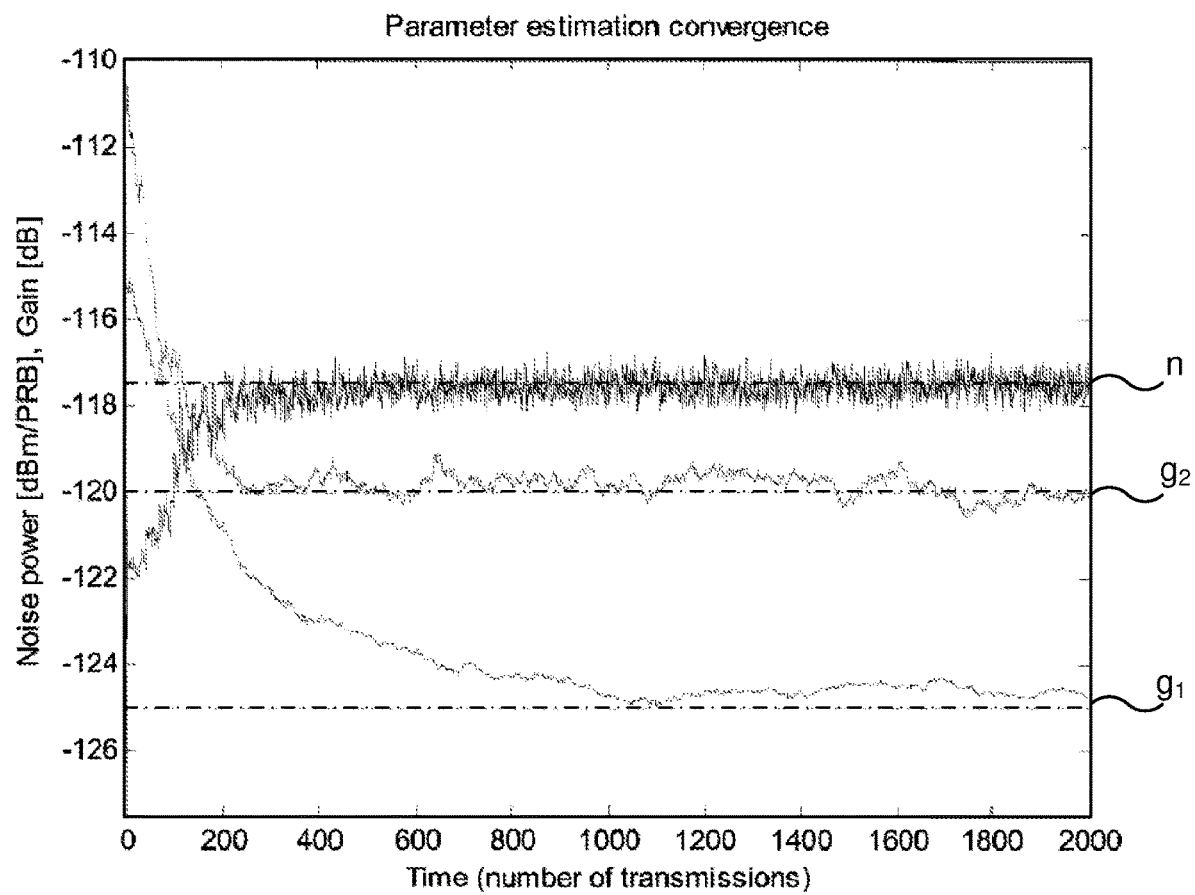
FIG. 5 illustrates convergence of the estimation performed by a method in an embodiment.

In FIG. 5, dashed lines show parameter values indicating true conditions, while solid lines show estimated parameter values using an embodiment where an update is performed every time feedback is received. The update step size λ is set to 0.3, the noise n=−117.5 dBm/PRB and the interfering cell gain $g_1$=−125 dB and $g_2$=−120 dB. The utilization for the interfering cells was drawn from uniform distribution U(0, 1). The parameter estimates converges well, and it can further be seen that the parameter that in this example affects SINR the least ($g_1$) is also the estimate that converges slowest; since $g_1$ affects SINR the least, the corresponding partial derivative will be small causing a relatively slow convergence.

Figure 6:
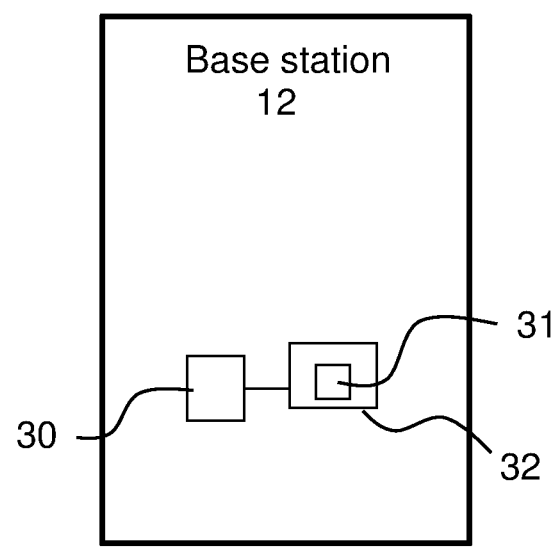
FIG. 6 illustrates a node performing the method according to an embodiment.

FIG. 6 illustrates a node embodied in the form of a base station 11 (even though other nodes such as for instance MME, SGW, a PGW nodes, etc., can be envisaged) performing the method described herein. In practice, the steps of the method is performed by a processing unit 30 embodied in the form of one or more microprocessors arranged to execute a computer program 31 downloaded to a suitable storage medium 32 associated with the microprocessor, such as a Random Access Memory (RAM), a Flash memory or a hard disk drive. The processing unit 30 is arranged to cause the base station 11 to carry out the method according to embodiments when the appropriate computer program 30 comprising computer-executable instructions is downloaded to the storage medium 32 and executed by the processing unit 30. The storage medium 32 may also be a computer program product comprising the computer program 31. Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 30 may alternatively be embodied in the form of a digital signal processor (DSP), an application specific integrated circuit (ASIC), a field-programmable gate array (FPGA), a complex programmable logic device (CPLD), etc.

Figure 7:
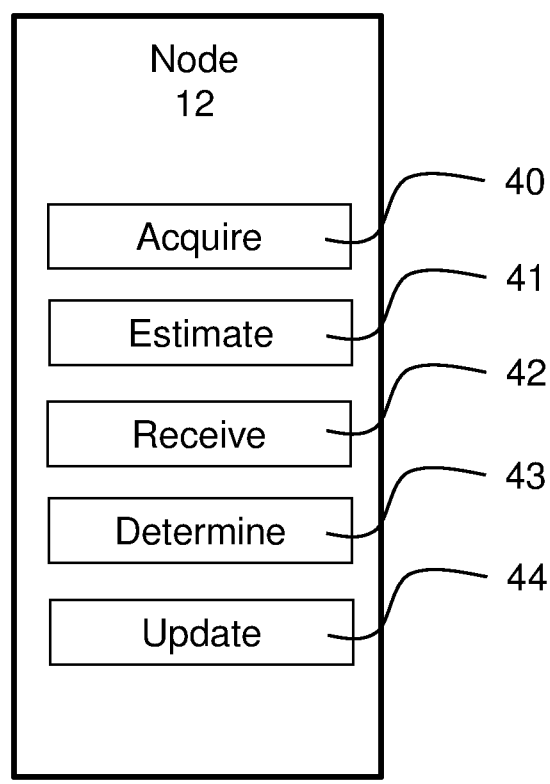
FIG. 7 illustrates a node performing the method according to another embodiment.

FIG. 7 illustrates a network node, such as the serving base station 12, configured to estimate parameters used for determining a signal-to-interference measure at a wireless communication device served by the base station 12 in a wireless communication network according to an embodiment.

The network node 12 comprises acquiring means 40 adapted to acquire an estimate of channel condition between the communication device and the serving base station, and between the communication device and at least one base station of a neighbouring cell, estimating means 41 adapted to estimate the signal-to-interference measure using the estimate of the respective channel condition and acquired output power and PRB utilization of each of the base stations, to be complied with when communicating with the communication device.

The network node 12 comprises receiving means 42 adapted to receive, from the communication device, an indication of quality of a channel via which the communication device is served by the base station, determining means 43 adapted to determine whether a change in the estimate of the signal-to-interference measure is required based on the indication of channel quality, and updating means 44 adapted to update the estimate of the channel condition between the communication device and the serving base station and/or between the communication device and the at least one base station of a neighbouring cell to attain the required change in the estimate of the signal-to-interference measure.

The means 40-44 may comprise a communications interface for receiving and providing information, and further a local storage for storing data, and may (in analogy with that previously discussed with reference to FIG. 6) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method at a node in a wireless communication network of estimating parameters used for determining a signal-to-interference measure at a communication device served by a serving base station, comprising:
    acquiring an estimate of channel condition between the communication device and the serving base station, and between the communication device and at least one base station of a neighbouring cell;
    estimating the signal-to-interference measure using the estimate of the respective channel conditions, and acquired output power and Physical Resource Block (PRB) utilization of the serving base station and the at least one base station of the neighbouring cell, to be complied with when communicating with the communication device;
    receiving, from the communication device, an indication of quality of a channel via which the communication device is served by the serving base station;
    determining whether a change in the estimate of the signal-to-interference measure is required based on said indication of channel quality; and
    updating the estimate of the channel condition between the communication device and the serving base station, or between the communication device and the at least one base station of a neighbouring cell, or between the communication device and the serving base station and between the communication device and the at least one base station of a neighbouring cell, to attain the required change in the estimate of the signal-to-interference measure.

2. The method of claim 1, wherein when the indication of the channel quality is received, indicating that the quality is not sufficiently high, decreasing an estimate of a measure of interference, in order for the estimate of the channel condition between the communication device and the serving base station, or between the communication device and the at least one base station of a neighbouring cell, or between the communication device and the serving base station and between the communication device and the at least one base station of a neighbouring cell, is updated to attain the decrease in the estimate of the measure of interference.

3. The method of claim 1, wherein when the indication of the channel quality is received, indicating that the quality is sufficiently high, increasing an estimate of a measure of interference, in order for the estimate of the channel condition between the communication device and the serving base station, or between the communication device and the at least one base station of a neighbouring cell, or between the communication device and the serving base station and between the communication device and the at least one base station of a neighbouring cell, is updated to attain the increase in the estimate of the measure of interference.

4. The method of claim 1, further comprising:
acquiring an estimate of thermal noise experienced by the communication device, wherein;
the estimating of the signal-to interference measure comprises estimating a Signal-to-Noise-Interference Ratio (SINR) at the communication device further using the estimate of the thermal noise;
the determining whether the change in the estimate of the signal-to-interference measure is required based on said indication of channel quality comprises determining whether a change in the estimate of the SINR is required; and
the updating further comprises updating the estimate of the thermal noise experienced by the communication device to attain the required change in the estimate of the SINR.

5. The method of claim 4, wherein:
the required change in the estimate of the SINR with respect to the respective channel condition or the thermal noise to be updated to attain the required change in the estimate of the SINR is calculated based on a partial derivative of the SINR with respect to said respective channel condition or thermal noise.

6. A network node configured to estimate parameters used for determining a signal-to-interference measure at a communication device served by a serving base station in a wireless communication network, the network node comprising:
a processing unit; and
a memory which, when executed by said processing unit, cause said network node to:
acquire an estimate of channel condition between the communication device and the serving base station, and between the communication device and at least one base station of a neighbouring cell;
estimate the signal-to-interference measure using the estimate of the respective channel conditions, and acquired output power and Physical Resource Block (PRB) utilization of each of the serving base station and the at least one base station of the neighbouring cell, to be complied with when communicating with the communication device;
receive, from the communication device, an indication of quality of a channel via which the communication device is served by the serving base station;
determine whether a change in the estimate of the signal-to-interference measure is required based on said indication of channel quality; and
update the estimate of the channel condition between the communication device and the serving base station, or between the communication device and the at least one base station of a neighbouring cell, or between the communication device and the serving base station and between the communication device and the at least one base station of a neighbouring cell, to attain the required change in the estimate of the signal-to-interference measure.

7. The network node of claim 6, wherein when the indication of the channel quality is received indicating that the quality is not sufficiently high, the network node to decrease an estimate of a measure of interference, in order for the estimate of the channel condition between the communication device and the serving base station, or between the communication device and the at least one base station of a neighbouring cell, or between the communication device and the serving base station and between the communication device and the at least one base station of a neighbouring cell, is updated to attain the decrease in the estimate of the measure of interference.

8. The network node of claim 6, wherein when the indication of the channel quality is received indicating that the quality is sufficiently high, the network node to increase an estimate of a measure of interference, in order for the estimate of the channel condition between the communication device and the serving base station, or between the communication device and the at least one base station of a neighbouring cell, or between the communication device and the serving base station and between the communication device and the at least one base station of a neighbouring cell, is updated to attain the increase in the estimate of the measure of interference.

9. The network node of claim 6, further being operative to:
acquire an estimate of thermal noise experienced by the communication device, wherein;
the estimate of the signal-to interference measure comprises the network node to estimate a Signal-to-Noise-Interference Ratio (SINR) at the communication device further using the estimate of the thermal noise; and
the determination of whether the change in the estimate of the signal-to-interference measure is required based on said indication of channel quality comprises the network node to determine whether a change in the estimate of the SINR is required; and
the update of the estimate of the channel condition further comprises the network node to update the estimate of the thermal noise experienced by the communication device to attain the required change in the estimate of the SINR.

10. The network node of claim 9, further being operative to:
calculate the required change in the estimate of the SINR with respect to the respective channel condition or the thermal noise to be updated to attain the required change in the estimate of the SINR based on a partial derivative of the SINR with respect to said respective channel condition or thermal noise.

11. The network node of claim 10, further being operative to:
calculate a factor with which the estimate of the thermal noise is to be updated as a function of a current thermal noise estimate and the partial derivative of the SINR with respect to the thermal noise, raised to an exponential power determined by a parameter reflecting the indicated channel quality.

12. The network node of claim 11, further being operative to:

determine the updated estimate of the thermal noise as a product of the current thermal noise estimate and the factor with which the estimate of the thermal noise is to be updated.

13. The network node of claim 10, further being operative to:
calculate a factor with which the estimate of the respective channel condition is to be updated as a function of a current respective channel condition estimate and the partial derivative of the SINR with respect to said respective channel condition, raised to an exponential power determined by a parameter reflecting the indicated channel quality.

14. A non-transitory computer-readable storage medium, having stored there on a computer program comprising computer-executable instructions which, when executed on a processing unit included in a node in a wireless communication network of estimating parameters used for determining a signal-to-interference measure at a communication device served by a serving base station, cause the node to perform operations comprising:
acquiring an estimate of channel condition between the communication device and the serving base station, and between the communication device and at least one base station of a neighbouring cell;
estimating the signal-to-interference measure using the estimate of the respective channel conditions, and acquired output power and Physical Resource Block (PRB) utilization of the serving base station and the at least one base station of the neighboring cell, to be complied with when communicating with the communication device;
receiving, from the communication device, an indication of quality of a channel via which the communication device is served by the serving base station;
determining whether a change in the estimate of the signal-to-interference measure is required based on said indication of channel quality; and
updating the estimate of the channel condition between the communication device and the serving base station, or between the communication device and the at least one base station of a neighbouring cell, or between the communication device and the serving base station and between the communication device and the at least one base station of a neighbouring cell, to attain the required change in the estimate of the signal-to-interference measure.

15. The non-transitory computer-readable storage medium of claim 14, wherein the instructions further cause the node to perform operations comprising:
when the indication of the channel quality is received, indicating that the quality is not sufficiently high, decreasing an estimate of a measure of interference, in order for the estimate of the channel condition between the communication device and the serving base station, or between the communication device and the at least one base station of a neighbouring cell, or between the communication device and the serving base station and between the communication device and the at least one base station of a neighbouring cell, is updated to attain the decrease in the estimate of the measure of interference.

16. The non-transitory computer-readable storage medium of claim 14, wherein the instructions further cause the node to perform operations comprising:
when the indication of the channel quality is received, indicating that the quality is sufficiently high, increasing an estimate of a measure of interference, in order for the estimate of the channel condition between the communication device and the serving base station, or between the communication device and the at least one base station of a neighbouring cell, or between the communication device and the serving base station and between the communication device and the at least one base station of a neighbouring cell, is updated to attain the increase in the estimate of the measure of interference.

17. The non-transitory computer-readable storage medium of claim 14, wherein the instructions further cause the node to perform operations comprising:
acquiring an estimate of thermal noise experienced by the communication device, wherein;
the estimating of the signal-to interference measure comprises estimating a Signal-to-Noise-Interference Ratio (SINR) at the communication device further using the estimate of the thermal noise;
the determining whether the change in the estimate of the signal-to-interference measure is required based on said indication of channel quality comprises determining whether a change in the estimate of the SINR is required; and
the updating further comprises updating the estimate of the thermal noise experienced by the communication device to attain the required change in the estimate of the SINR.

18. The non-transitory computer-readable storage medium of claim 17, wherein:
the required change in the estimate of the SINR with respect to the respective channel condition or the thermal noise to be updated to attain the required change in the estimate of the SINR is calculated based on a partial derivative of the SINR with respect to said respective channel condition or thermal noise.

* * * * *